US011968984B2

(12) United States Patent
 Chatot et al.

(10) Patent No.: US 11,968,984 B2
(45) Date of Patent: Apr. 30, 2024

(54) BAKING DRAWER AND METHOD OF CIRCULATING AIR WITHIN THE BAKING DRAWER

(71) Applicant: Whirlpool Corporation, Benton Harbor, MI (US)

(72) Inventors: Brian P. Chatot, St. Joseph, MI (US); Lauren E. Bull, Park Ridge, IL (US); Pallavi Saha, Lima, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 774 days.

(21) Appl. No.: 17/082,716

(22) Filed: Oct. 28, 2020

(65) Prior Publication Data

US 2021/0037833 A1    Feb. 11, 2021

Related U.S. Application Data

(62) Division of application No. 14/819,519, filed on Aug. 6, 2015, now Pat. No. 10,842,155.

(51) Int. Cl.
| | |
|---|---|
| *A21B 1/26* | (2006.01) |
| *A21B 1/50* | (2006.01) |
| *A23L 5/10* | (2016.01) |
| *A47J 37/01* | (2006.01) |
| *F24C 15/16* | (2006.01) |

(52) U.S. Cl.
 CPC .................. *A21B 1/26* (2013.01); *A23L 5/15* (2016.08); *A23L 5/17* (2016.08); *A47J 37/015* (2013.01); *A21B 1/50* (2013.01); *F24C 15/16* (2013.01)

(58) Field of Classification Search
 CPC . A47J 37/015; A21B 1/26; A21B 1/50; A23L 5/17; A23L 5/15; F24C 15/16; F24C 15/18
 See application file for complete search history.

(56) References Cited

U.S. PATENT DOCUMENTS

| | | | |
|---|---|---|---|
| 5,617,839 A | 4/1997 | Jennings et al. | |
| 6,237,775 B1 | 5/2001 | Hatch et al. | |
| 6,294,762 B1 * | 9/2001 | Faries, Jr. ............. | A61M 5/445 219/400 |
| 7,038,175 B2 | 5/2006 | Henninger et al. | |
| 2003/0226452 A1 * | 12/2003 | Artt ......................... | A21B 1/26 99/476 |
| 2006/0043087 A1 | 3/2006 | Gagas et al. | |
| 2006/0278629 A1 * | 12/2006 | Gagas ................. | H05B 6/6408 236/1 C |
| 2007/0074713 A1 | 4/2007 | Cadima et al. | |
| 2008/0173631 A1 * | 7/2008 | Gagas ..................... | B23P 11/00 219/400 |

* cited by examiner

*Primary Examiner* — Brian W Jennison
(74) *Attorney, Agent, or Firm* — Diederiks & Whitelaw, PLC.

(57) ABSTRACT

A baking drawer includes an oven cavity and a drawer assembly movable relative to the oven cavity between an extended position, where the drawer assembly is accessible by a user, and a retracted position, where the drawer assembly is located within the oven cavity. The drawer assembly has a bottom wall, two opposing sidewalls and a rear wall. A first vent is formed in the bottom wall, and a second vent is formed in the rear wall. The vents allow air to flow into and out of a ventilated region delineated by the bottom wall, the two sidewalls and the rear wall.

20 Claims, 3 Drawing Sheets

BAKING DRAWER AND METHOD OF CIRCULATING AIR WITHIN THE BAKING DRAWER

CROSS-REFERENCE TO RELATED APPLICATIONS

This application is a divisional of application Ser. No. 14/819,519, titled "Baking Drawer and Method of Circulating Air Within the Baking Drawer" and filed Aug. 6, 2015. The entire content of this application is incorporated herein by reference.

BACKGROUND OF THE INVENTION

The present invention pertains to the art of cooking and, more particularly, to a baking drawer having improved airflow.

Typically, baking drawers are intended to provide a user with the benefits of a conventional oven while taking up a reduced amount of space. Specifically, conventional baking drawers generally have heights between 4 and 4.5 inches. However, due to the limits imposed by their smaller size, such baking drawers can also be less effective. In particular, conventional baking drawers rely on radiation alone for heat transfer, which contributes to long preheat times. To reduce such problems, the baking drawers include two heating elements, and the drawer assemblies are made from two different materials: steel and aluminized steel. Each of these design choices increases costs, and the use of two heating elements also increases the drawer height. Yet, preheat times can still be as long as 45 minutes.

Accordingly, there is a need in the art for a baking drawer that maximizes the advantages of its form factor while minimizing the disadvantages. Specifically, there is a need in the art for a baking drawer having a design and operation resulting in a reduced size, cost and preheat time.

SUMMARY OF THE INVENTION

The present invention is directed to a baking drawer including an oven cavity and a drawer assembly movable relative to the oven cavity between an extended position, where the drawer assembly is accessible by a user, and a retracted position, where the drawer assembly is located within the oven cavity. The drawer assembly has a bottom wall, two opposing sidewalls and a rear wall. A vent is formed in the bottom wall. The vent allows air to flow into a ventilated region delineated by the bottom wall, the two sidewalls and the rear wall. The vent is configured to direct air entering the ventilated region toward a center of the drawer assembly. Preferably, the vent is a louver.

In one embodiment, the vent constitutes a first vent, and the first vent is formed in the bottom wall proximate to a first one of the two sidewalls. A second vent is formed in the bottom wall proximate to a second one of the two sidewalls. The first vent is configured to direct air entering the ventilated region toward the second one of the two sidewalls, and the second vent is configured to direct air entering the ventilated region toward the first one of the two sidewalls.

In another embodiment, the vent constitutes a first vent, and a second vent is formed in the rear wall. The drawer assembly is configured such that air enters the ventilated region through the first vent and exits the ventilated region through the second vent. Preferably, the second vent is at least 50% as large as the first vent.

In a preferred embodiment, the drawer assembly is formed from a single material, which is preferably aluminized steel. The baking drawer further includes a heating element and does not include a second heating element.

Additional objects, features and advantages of the present invention will become more readily apparent from the following detail description of preferred embodiments when taken in conjunction with the drawings wherein like reference numerals refer to corresponding parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
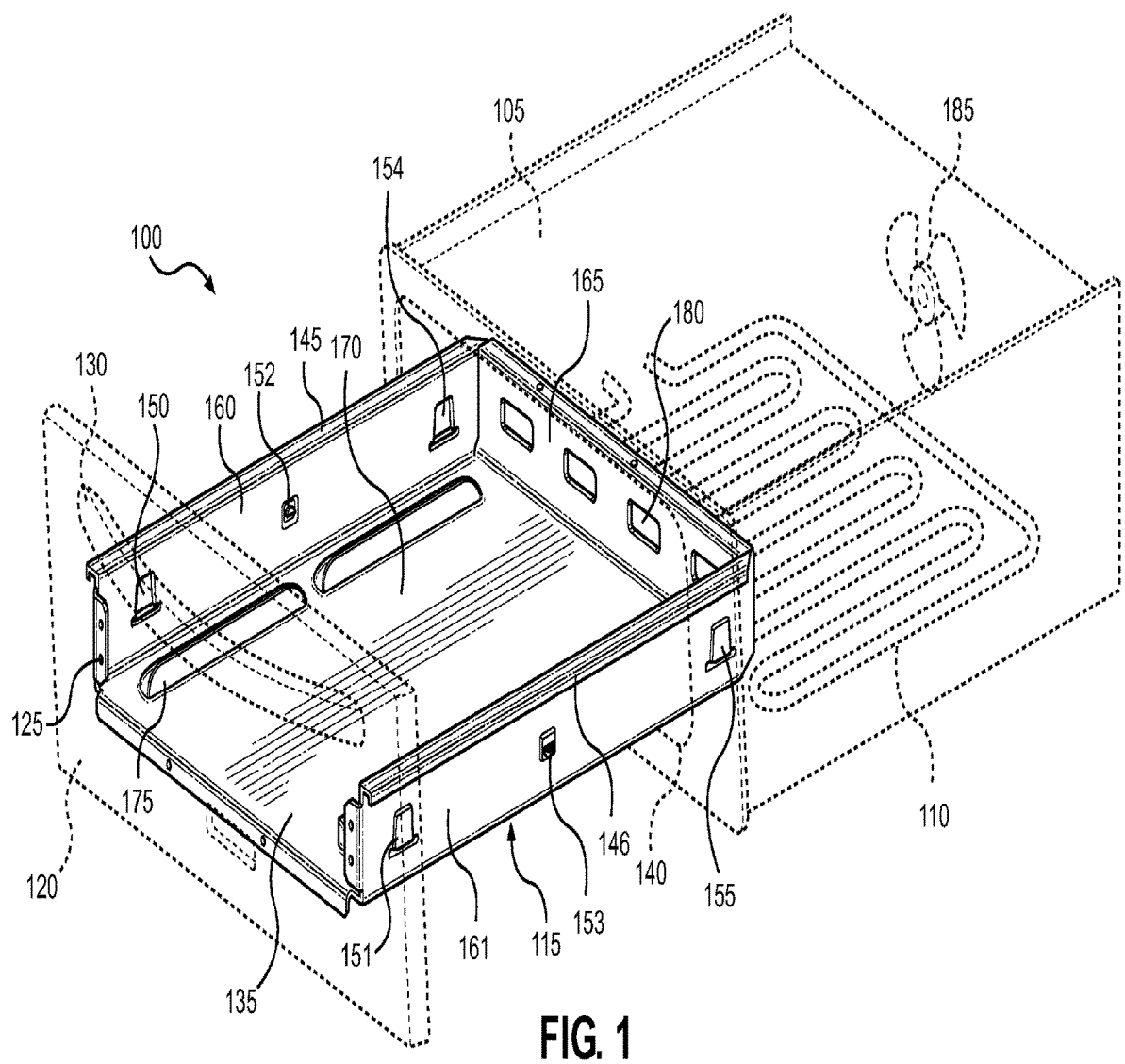
FIG. 1 is a perspective view of a baking drawer constructed in accordance with the present invention.

With initial reference to FIG. 1, there is illustrated a baking drawer 100 constructed in accordance with the present invention. Baking drawer 100 is shown as a stand-alone unit. However, a baking drawer of the present invention can certainly be employed in combination with a conventional oven, for example, as a lower or upper drawer in a range. Baking drawer 100 includes an oven cavity 105, a heating element 110, a drawer assembly 115 and a front wall 120. Front wall 120 is coupled to drawer assembly 115 by a plurality of mounting holes (one of which is labeled 125) and corresponding fastening elements (not shown). In addition, front wall 120 has a handle 130, which allows a user to move drawer assembly 115 between an extended position and a retracted position. In the extended position, drawer assembly 115 is accessible by the user such that the user can, for example, place a food item (not shown) on drawer assembly 115. Preferably, the food item is placed on a rack (not shown) that is supported by a bottom wall 135 of drawer assembly 115. If the user then moves drawer assembly 115 to the retracted position, drawer assembly 115, and the food item supported thereon, will be located within oven cavity 105 with front wall 120 sealing an opening 140 of oven cavity 105. As a result, heat generated by heating element 110 warms or cooks the food item, as desired by the user. Movement of drawer assembly 115 between the extended and retracted positions is facilitated by side rails 145 and 146 and side features 150-155, which cooperate with corresponding structure (not shown) located within oven cavity 105 or coupled to oven cavity 105. Preferably, side rails 145 and 146 are formed integrally with drawer assembly 115.

Drawer assembly 115 has two opposing sidewalls 160 and 161 and a rear wall 165, which together with bottom wall 135 delineate a ventilated region 170. Drawer assembly 115 also has a plurality of vents, each of which is configured to allow air to pass into or out of ventilated region 170. Specifically, at least one and preferably a plurality of bottom vents (one of which is labeled 175) is formed in bottom wall 135. In the embodiment of FIG. 1, a pair of longitudinally-spaced bottom vents is located proximate to sidewall 160, while a corresponding pair of bottom vents is located proximate to sidewall 161 (although the second pair is not visible in FIG. 1). Preferably, the bottom vents are louvers, which, for purposes of the present invention, are defined as angled, directional vents that direct or deflect air in a direction determined by the angle of the louver. For example, the bottom vents of drawer assembly 115 direct air rising from heating element 110 toward the center of drawing assembly 115. Additionally, at least one and preferably a plurality of rear vents (one of which is labeled 180) is formed in rear wall 165. The rear vents are spaced laterally along rear wall 165. Preferably, the rear vents are configured so as not to impede air flowing out of ventilated region 170. To accomplish this, the rear vents are free of obstructions and relatively large. In contrast, providing a larger number of smaller vents would restrict airflow and cause some air to be redirected back towards the front of drawer assembly 115. This interferes with the air flowing through ventilated region 170, thereby decreasing performance of baking drawer 100. Accordingly, the rear vents are preferably at least 50% as large as the bottom vents and, more preferably, at least 75-80% as large. With this in mind, the area of the holes defining each vent is the relevant metric. Regardless, as noted above, the rear vents 180 are quite large and preferably free of obstructions. Therefore, each rear vent 180 is preferably not subdivided into a plurality of smaller holes. Also, for the purposes of the present invention, the orientations of the longitudinal and lateral axes are not based on which of rear wall 165 or sidewalls 160 and 161 is longer. Instead, the longitudinal axis is defined as running between the front and back of baking drawer 100, and the lateral axis is defined as running between the sides of baking drawer 100.

As a result of the various vents described above, heat transfer in baking drawer 100 is driven by both convection (via the various vents formed in drawer assembly 115) and radiation (via heating element 110). This reduces the time required to heat baking drawer 100, and more specifically oven cavity 105, to a given temperature as compared with prior art units in which heat transfer is driven by radiation alone. Optionally, to aid in convection, a fan 185 can be added to increase the circulation of air within oven cavity 105.

Figure 2:
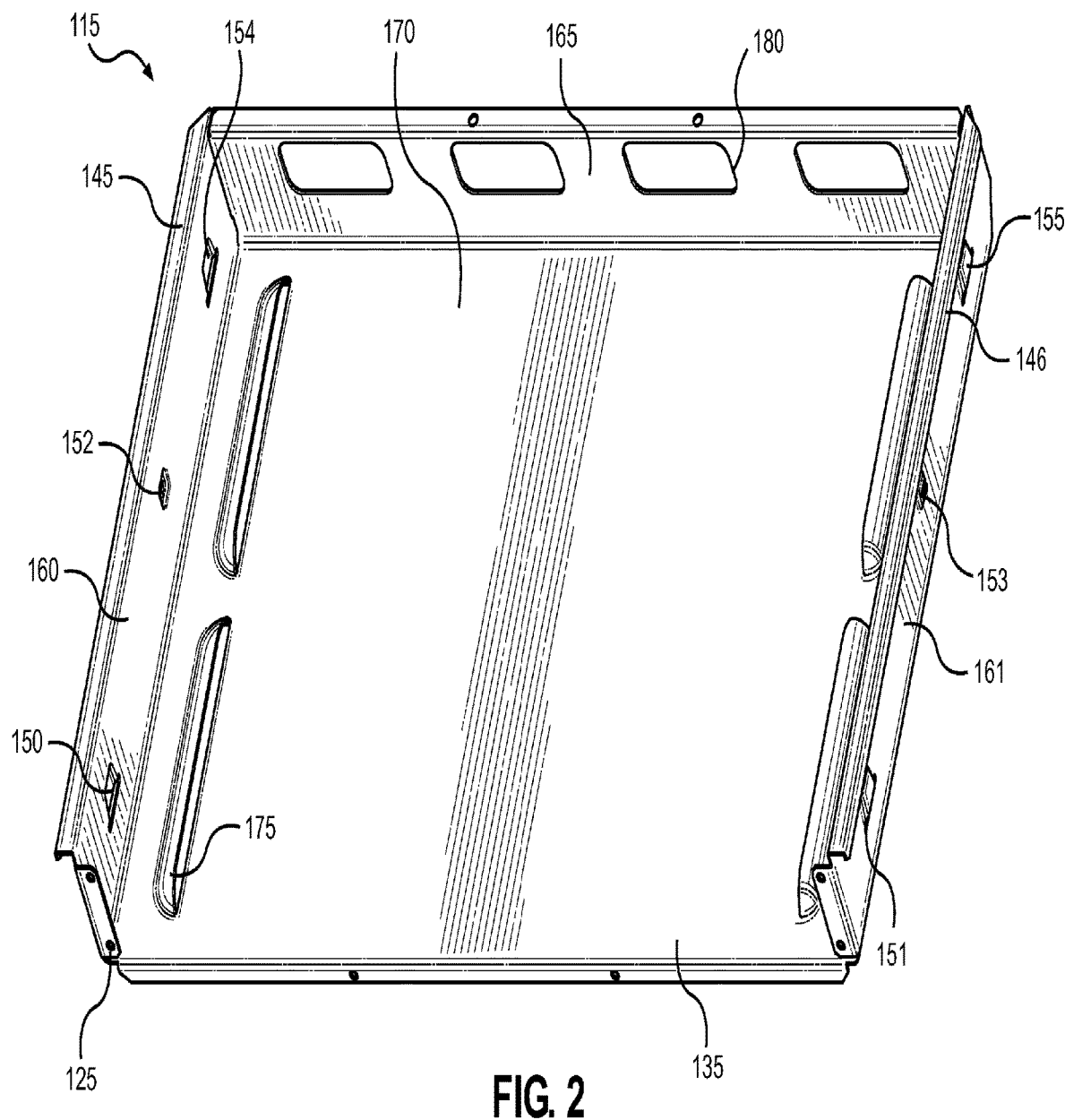
FIG. 2 is a perspective view of a drawer assembly of the baking drawer.
Figure 3:
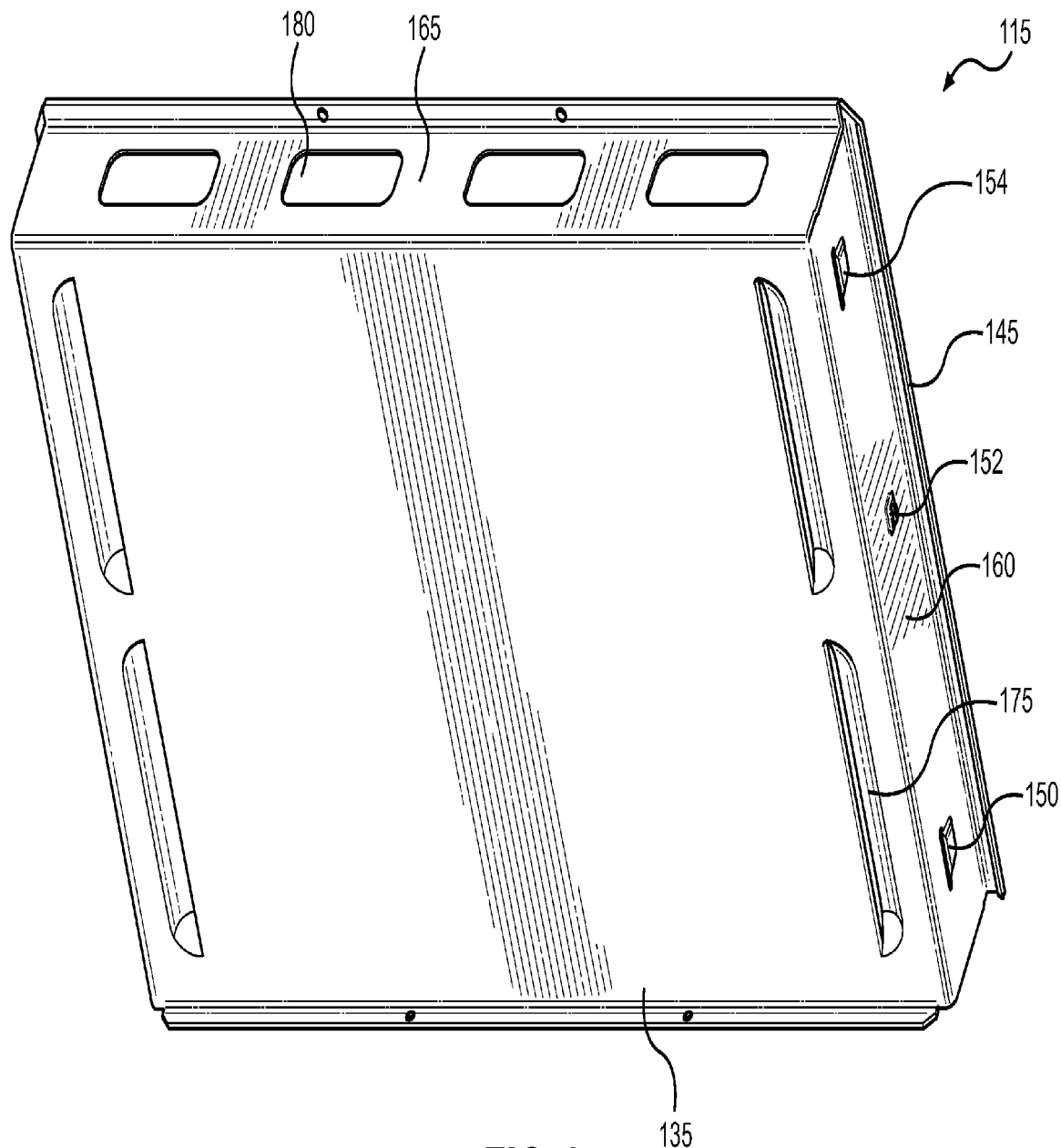
FIG. 3 is a perspective view of the drawer assembly from below.

Turning to FIGS. 2 and 3, drawer assembly 115 is shown separate from the other portions of baking drawer 100. Preferably, drawer assembly 115 is formed from a single material: aluminized steel. In contrast, prior art units are typically formed from two different materials. Accordingly, the present invention eliminates an assembly step, thereby reducing the cost of manufacturing drawer assembly 115. In the angles shown in FIGS. 2 and 3, both pairs of bottom vents are now visible. As described above, air flows into or out of ventilated region 170 via the various vents of drawer assembly 115. In particular, drawer assembly 115 is configured such that air flows into ventilated region 170 through the bottom vents of bottom wall 135. If a food item is located on a rack in ventilated region 170, the air flows below the rack and food item as well as through the rack to the sides and top of the food item. The air from each pair of bottom vents then meets in the center, travels rearwardly and flows out of ventilated region 170 through the rear vents of rear wall 165. The improved airflow within ventilated region 170 reduces preheating times and enables the use of a single heating element (i.e., heating element 110). In contrast, prior art units include two heating elements. Eliminating the second heating element lowers the cost of baking drawer 100 and also allows the height of baking drawer 100 to be decreased relative to prior art units.

In an alternative embodiment, the bottom vents of drawer assembly 115 are reversed and, therefore, direct air in the opposite direction, i.e., toward sidewalls 160 and 161. The air is then redirected towards the center of drawer assembly 115 by sidewalls 160 and 161 before flowing out of ventilated region 170 through the rear vents of rear wall 155. This arrangement is advantageous because, when the bottom vents are reversed, the user is unable to see through the bottom vents to the area below drawing assembly 115. Furthermore, it should be recognized that various other vent arrangements can be used in connection with the present invention. For example, the number, size, shape and position of the vents can be altered so long as rising air is directed into ventilated region 170, around a food item located in ventilated region 170 and then out of ventilated region 170 mainly through the rear vents 180 but some air flowing over one of more of sidewalls 160 and 161 and/or rear wall 154.

Based on the above, it should be readily apparent that the present invention advantageously provides a baking drawer having a reduced size, cost and preheat time. Although described with reference to preferred embodiments, it should be readily understood that various changes or modifications could be made to the invention without departing from the spirit thereof. In general, the invention is only intended to be limited by the scope of the following claims.

The invention claimed is:

1. A baking drawer comprising:
   an oven cavity;
   a heating element; and
   a drawer assembly movable relative to the oven cavity between an extended position, where the drawer assembly is accessible by a user, and a retracted position, where the drawer assembly is located within the oven cavity, the drawer assembly including:
   a bottom wall;
   two opposing sidewalls;
   a rear wall; and
   at least one directional vent formed in the bottom wall, the at least one vent allowing air to flow into a ventilated region delineated by the bottom wall, the two sidewalls and the rear wall.

2. The baking drawer of claim 1, wherein the at least one directional vent is configured to direct air entering the ventilated region toward a center of the drawer assembly.

3. The baking drawer of claim 2, wherein the at least one vent is a louver.

4. The baking drawer of claim 1, wherein:
   the at least one directional vent constitutes a first vent and a second vent;
   the first vent is formed in the bottom wall proximate to a first one of the two sidewalls; and
   the second vent is formed in the bottom wall proximate to a second one of the two sidewalls.

5. The baking drawer of claim 4, wherein:
   the first vent is configured to direct air entering the ventilated region toward the second one of the two sidewalls; and
   the second vent is configured to direct air entering the ventilated region toward the first one of the two sidewalls.

6. The baking drawer of claim 1, wherein the at least one directional vent constitutes a first vent, said baking drawer further comprising at least one second vent formed in the rear wall.

7. The baking drawer of claim 6, wherein the drawer assembly is configured such that air enters the ventilated region through the first vent and exits the ventilated region through the at least one second vent.

8. The baking drawer of claim 6, wherein the at least one second vent is larger than 50% of the size of the first vent.

9. The baking drawer of claim 1, wherein the drawer assembly is formed of a single material.

10. The baking drawer of claim 9, wherein the single material is aluminized steel.

11. The baking drawer of claim 1, wherein the heating element constitutes a first heating element arranged below the bottom wall, and the baking drawer does not comprise a second heating element.

12. The baking drawer of claim 1, wherein the at least one directional vent is a louver.

13. A baking drawer comprising:
an oven cavity;
a heating element; and
a drawer assembly movable relative to the oven cavity between an extended position, where the drawer assembly is accessible by a user, and a retracted position, where the drawer assembly is located within the oven cavity, the drawer assembly including:
a bottom wall;
two opposing sidewalls;
a rear wall;
a first vent formed in the bottom wall and configured to cause air to flow into a ventilated region delineated by the bottom wall, the two opposing sidewalls and the rear wall; and
a second vent formed in the rear wall and configured to cause air to exit the ventilated region, wherein the second vent has a different size or shape than the first vent.

14. The baking drawer of claim 13, wherein the first vent is further configured to redirect air entering the ventilated region toward a center of the drawer assembly.

15. The baking drawer of claim 13, wherein the first vent is formed in the bottom wall proximate to a first one of the two opposing sidewalls, said drawer assembly further comprising a third vent formed in the bottom wall proximate to a second one of the two opposing sidewalls and configured to cause air to flow into the ventilated region.

16. The baking drawer of claim 15, wherein:
the first vent is configured to redirect air entering the ventilated region toward the second one of the two sidewalls; and
the third vent is configured to redirect air entering the ventilated region toward the first one of the two sidewalls.

17. The baking drawer of claim 13, wherein the second vent is larger than 50% of the size of the first vent.

18. The baking drawer of claim 13, wherein the drawer assembly is formed from a single material, with the single material being aluminized steel.

19. The baking drawer of claim 13, wherein:
the heating element constitutes a first heating element configured to heat the oven cavity, said heating element being arranged below the bottom wall, wherein the baking drawer does not include a second heating element.

20. The baking drawer of claim 13, wherein at least the first vent is a louver.

* * * * *